US011673045B2

United States Patent
Cook

(10) Patent No.: US 11,673,045 B2
(45) Date of Patent: Jun. 13, 2023

(54) EVENT SYNCHRONIZATION IN AN ONLINE GAME

(71) Applicant: Charter Communications Operating, LLC, St. Louis, MO (US)

(72) Inventor: Charles Cook, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/216,535

(22) Filed: Mar. 29, 2021

(65) Prior Publication Data

US 2022/0305380 A1 Sep. 29, 2022

(51) Int. Cl.
*A63F 13/335* (2014.01)
*A63F 13/352* (2014.01)
*H04L 43/0852* (2022.01)

(52) U.S. Cl.
CPC .......... *A63F 13/335* (2014.09); *A63F 13/352* (2014.09); *H04L 43/0852* (2013.01); *A63F 2300/5533* (2013.01)

(58) Field of Classification Search
CPC .................. A63F 13/335; A63F 13/352; A63F 2300/5533; H04L 43/0852
See application file for complete search history.

(56) References Cited

U.S. PATENT DOCUMENTS

| 10,162,896 | B1* | 12/2018 | Sumter | G06F 16/9535 |
|---|---|---|---|---|
| 10,467,327 | B1* | 11/2019 | Arazi | G06Q 30/02 |
| 11,238,470 | B2* | 2/2022 | Stepp | G06Q 10/00 |
| 2002/0026321 | A1* | 2/2002 | Faris | H04L 63/12 |
| | | | | 705/311 |
| 2020/0045661 | A1* | 2/2020 | Verso | H04W 84/20 |
| 2021/0203750 | A1* | 7/2021 | Giacalone | H04L 67/322 |

* cited by examiner

*Primary Examiner* — William H McCulloch, Jr.
*Assistant Examiner* — Ankit B Doshi
(74) *Attorney, Agent, or Firm* — Dority & Manning, P.A.

(57) ABSTRACT

Event synchronization in an online game is disclosed. A central computing device sends event information that identifies an event and an event depiction timestamp that identifies a future time at which to depict the event to a plurality of computing devices that are time synchronized with one another. The central computing device receives, from a first set of computing devices, a set of first messages, each first message including action information that identifies a user input received by a corresponding computing device and an action timestamp that identifies a time at which the user input was received by the corresponding computing device. Based on the action timestamps and the user inputs in the set of first messages, a next event to be depicted is determined, and next event information that identifies the next event is sent to the plurality of computing devices.

17 Claims, 11 Drawing Sheets

EVENT SYNCHRONIZATION IN AN ONLINE GAME

BACKGROUND

Individuals living in geographically distant locations frequently play online games with one another. Such individuals each have a game computer, such as a personal computer, a gaming console, or a mobile device, which continuously communicates with a game server that receives inputs from all the game computers, makes determinations based on the inputs, and sends messages to each of the game computers regarding the determinations so the game advances identically for each player.

Action online games often involve relatively concurrent actions by multiple players, and the first acting player may have an advantage over a later acting player. Actions from two different players may occur within milliseconds of one another. Players may be relatively geographically distant from one another, such as one player in Europe and another in New York, and the differences in the network delay between the game server and each game computer may be substantial.

SUMMARY

The embodiments disclosed herein implement event synchronization in an online game.

In one embodiment a method is provided. The method includes sending, by a central computing device to a plurality of computing devices, event information that identifies an event and an event depiction timestamp that identifies a future time at which to depict the event, wherein the central computing device and the plurality of computing devices are time synchronized with one another. The method further includes receiving, by the central computing device, from a first set of computing devices of the plurality of computing devices, a corresponding set of first messages, each first message including action information that identifies a user input received by a corresponding computing device and an action timestamp that identifies a time at which the user input was received by the corresponding computing device. The method further includes based on the action timestamps and the user inputs in the set of first messages, determining a next event to be depicted. The method further includes sending, to the plurality of computing devices, next event information that identifies the next event.

In another embodiment a central computing device is provided. The central computing device includes a memory and a processor device coupled to the memory configured to send, to a plurality of computing devices, event information that identifies an event and an event depiction timestamp that identifies a future time at which to depict the event, wherein the central computing device and the plurality of computing devices are time synchronized with one another. The processor device is further configured to receive, from a first set of computing devices of the plurality of computing devices, a corresponding set of first messages, each first message including action information that identifies a user input received by a corresponding computing device and an action timestamp that identifies a time at which the user input was received by the corresponding computing device. The processor device is further configured to, based on the action timestamps and the user inputs in the set of first messages, determine a next event to be depicted. The processor device is further configured to send, to the plurality of computing devices, next event information that identifies the next event.

In another embodiment a non-transitory computer-readable storage medium is provided. The non-transitory computer-readable storage medium includes executable instructions to cause a processor device to send, to a plurality of computing devices, event information that identifies an event and an event depiction timestamp that identifies a future time at which to depict the event, wherein a central computing device and the plurality of computing devices are time synchronized with one another. The instructions further cause the processor device to receive, from a first set of computing devices of the plurality of computing devices, a corresponding set of first messages, each first message including action information that identifies a user input received by a corresponding computing device and an action timestamp that identifies a time at which the user input was received by the corresponding computing device. The instructions further cause the processor device to, based on the action timestamps and the user inputs in the set of first messages, determine a next event to be depicted. The instructions further cause the processor device to send, to the plurality of computing devices, next event information that identifies the next event.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
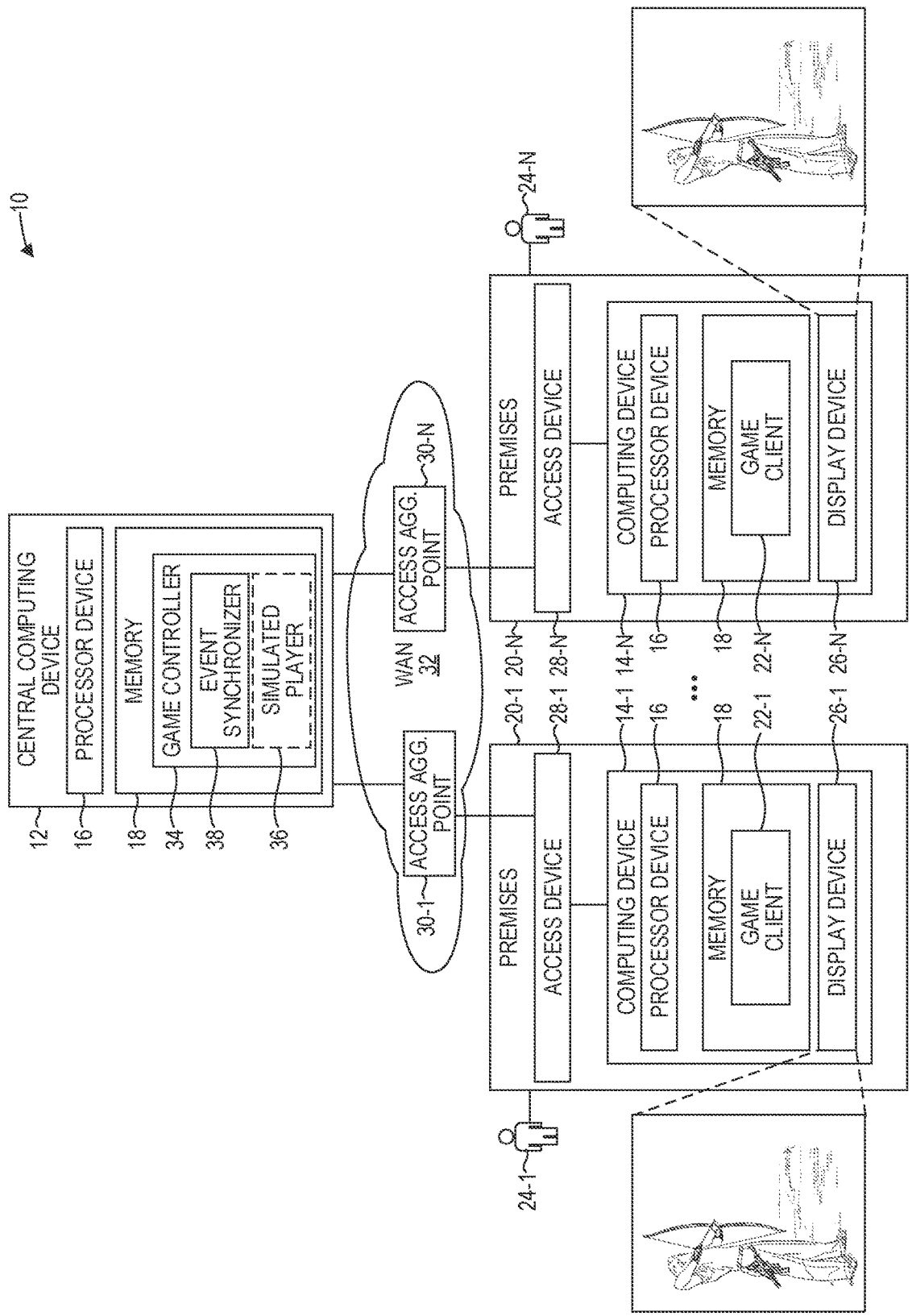
FIGS. 1A-1D are block diagrams of an environment in which embodiments may be practiced, at different points in time.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Individuals living in geographically distant locations frequently play online games with one another. Such individuals each have a game computer, such as a personal computer, a gaming console, or a mobile device, which continuously communicates with a game server that receives inputs from all the game computers, makes determinations based on the inputs, and sends messages to each of the game computers regarding the determinations so the game advances identically for each player.

Action online games often involve relatively concurrent actions by multiple players, and the first acting player may have an advantage over a later acting player. Actions from two different players may occur within milliseconds of one another. Players may be relatively geographically distant from one another, such as one player in Europe and another in New York, and the differences in the network delay between the game server and each game computer may be substantial.

Due to the differences in network delay between different game computers and the game server, it can be difficult or impossible for the game server to precisely know which of two substantially concurrent actions occurred first. This can lead to erroneous determinations by the game server, which results in advancing a game in a way that is inconsistent with the actual actions of the players.

The embodiments disclosed herein implement event synchronization in an online game. A central computing device, such as a game server, time synchronizes with each of a plurality of other computing devices, such as personal computers, game consoles, and/or mobile devices, executing an online game. The central computing device determines an event to be depicted on each of the computing devices at a future time and sends, to the computing devices, event information that identifies the event and an event depiction timestamp that identifies a future time at which the event is to be depicted by the computing devices.

The computing devices receive the event information, and, at the designated future time, concurrently depict the event to each of the players. The computing devices then receive user input from the players in response to the depiction of the event. Each computing device generates a timestamp, which identifies the time of the user input, and action information, which identifies the user input, and sends the timestamp and the action information to the central computing device.

The central computing device collects the information sent by the computing devices, and determines, based on the timestamps and the user inputs, an appropriate next game event to be depicted. The central computing device sends to the computing devices the next game event to be depicted by the computing devices and an event timestamp that identifies the future time at which the next game event is to be depicted to the players. In this manner, the central computing device and the computing devices can ensure perfectly synchronized events such that the central computing device can make precise determinations as to which players acted at which times, irrespective of significant network delays among the different computing devices and the central computing device.

FIG. 1A is block diagram of an environment 10 in which embodiments may be practiced. The environment 10 includes a central computing device 12 and a plurality of computing devices 14-1-14-N (generally, computing devices 14). The central computing device 12 and the computing devices 14 each have one or more processor devices 16 and a memory 18. The computing device 14-1 is located in a premises 20-1, such as a residence, a business, or the like. The computing device 14-N is located in a premises 20-N. While only one computing device 14 is illustrated in each of premises 20-1, 20-N, in practice any number of computing devices 14 may be in a single premises 20. The computing devices 14 may comprise, by way of non-limiting example, a desktop or mobile computing device, a smart phone, a computing tablet, a game console, or the like. The premises 20-1 and the premises 20-N may be substantially different physical distances from the central computing device 12. For example, the central computing device 12 and the premises 20-1 may be located in Arizona, and the premises 20-N may be located in Spain.

The computing device 14-1 includes a game client 22-1 via which a user 24-1 can play an online game. The game client 22-1 depicts the game on a display device 26-1.

An access device 28-1, such as a cable modem, an xDSL modem, an optical network unit (ONU), or the like, is configured to couple the computing device 14-1, either directly or indirectly through a gateway device such as a router (not illustrated), to an access aggregation point 30-1, such as, by way of non-limiting example, a digital subscriber line access multiplexer (DSLAM), an optical line termination (OLT), a cable modem termination system (CMTS), or the like, that is part of a wide area network (WAN) 32.

Similarly, the computing device 14-N includes a game client 22-N via which a user 24-N can play a game. The game client 22-N depicts the game on a display device 26-N.

An access device 28-N is configured to couple the computing device 14-N, either directly or indirectly through a gateway device such as a router (not illustrated), to an access aggregation point 30-N, that is part of the WAN 32.

The central computing device 12 is communicatively coupled to the access aggregation points 30. The central computing device 12 includes a game controller 34 that communicates with the game clients 22 to provide the users 24 with the online game. In some embodiments, the central computing device 12 may include a simulated player 36, which appears to an actual user, such as the user 24-1, as another human player, such that the user 24-1 can enjoy the online game even without another human player, such as the user 24-N.

The game controller 34 includes an event synchronizer 38 that ensures that the game clients 22-1, 22-N concurrently depict all, or certain, events on the display devices 26-1, 26-N concurrently so that each user 24-1, 24-N is presented with the event at precisely the same time. Initially, the event synchronizer 38 time synchronizes with the game clients 22. This may be done, for example, using precision time protocol (PTP), or via a global positioning system (GPS) signal.

In one embodiment, the game controller 34 operates as a PTP master clock. The event synchronizer 38 may communicate with the access device 28-1 via the access aggregation point 30-1 and make the access device 28-1 a PTP slave clock. The game client 22-1 is locked to the PTP slave clock that interacts with the game controller 34 to synchronize time. Similarly, the event synchronizer 38 communicates with the access device 28-N via the access aggregation point 30-N and makes the access device 28-N a PTP slave clock. The game client 22-N is locked to the PTP slave clock that interacts with the game controller 34 to synchronize time, such that the central computing device 12 and the computing devices 14-1, 14-N are all time synchronized.

In one embodiment, the event synchronizer 38 may communicate with the access device 28-1 via the access aggregation point 30-1 and make the access device 28-1 a PTP master clock. The game client 22-1 includes a PTP slave clock that interacts with the access device 28-1 to synchronize time. Similarly, the event synchronizer 38 communicates with the access device 28-N via the access aggregation point 30-N and makes the access device 28-N a PTP master clock. The game client 22-N includes a PTP slave clock that interacts with the access device 28-N to synchronize time, such that the central computing device 12 and the computing devices 14-1, 14-N are all time synchronized.

In another embodiment, where there are constant and known delays between the game clients 22 and the corresponding access devices 28, GPS may be used to synchronize events. In such embodiments, the game controller 34 has a GPS receiver and establishes a clock synchronized to its GPS receiver. The access device 28-1 also has a GPS receiver and establishes a clock synchronized to its GPS receiver. The game client 22-1 is locked to the clock in the access device 28-1. Both the game controller 34 and the game client 22-1 are locked to clocks synchronized to GNSS GPS via their respective GPS receivers. The event synchronizer 38 may communicate with the access device 28-1 via the access aggregation point 30-1 and communicate synchronization events and responses between the game controller 34 and the game client 22-1.

Similarly, the access device 28-N also has a GPS receiver and establishes a clock synchronized to its GPS receiver. The game client 22-N is locked to the clock in the access device 28-N. Both the game controller 34 and the game client 22-N are locked to clocks synchronized to GNSS GPS via their respective GPS receivers. The event synchronizer 38 may communicate with the access device 28-N via the access aggregation point 30-N and communicates synchronization events and responses between the game controller 34 and the game client 22-N.

It is noted that, because the game controller 34 is a component of the central computing device 12, functionality implemented by the game controller 34 may be attributed to the central computing device 12 generally. Moreover, in examples where the game controller 34 comprises software instructions that program the processor device 16 to carry out functionality discussed herein, functionality implemented by the game controller 34 may be attributed herein to the processor device 16 of the central computing device 12.

As an example of event synchronization in an online game according to one embodiment, assume that the user 24-1 desires to play a particular shooting game on the computing device 14-1. The shooting game may involve a shooting implement such as handgun, a rifle, a tank, a bow, or the like that emits some object, such as a bullet, a shell, an arrow, or the like. In this example, the shooting game involves a bow as the shooting implement, and the object that is emitted is an arrow. In this game, the winner is the individual who hits the target first with an arrow.

The user 24-1 initiates the game client 22-1 on the computing device 14-1. The game client 22-1 may, as part of an initialization stage, communicate with the game controller 34 to identify the game client 22-1 as participating in the game. The game controller 34 may begin a time synchronization process with the game client 22-1, such as a GPS time synchronization process, a PTP time synchronization process, or the like. The game controller 34 may also determine a network delay value that quantifies an amount of time for a message to travel between the game controller 34 and the computing device 14-1. The network delay value may be a predetermined network delay value based on historical measurements between the game controller 34 and the computing device 14-1, or may be determined during the initialization stage. In that latter case, the game controller 34 may send the computing device 14-1 a predetermined type of message with a timestamp. The computing device 14-1 receives the message, generates a response message with a timestamp, and sends the response message back to the game controller 34.

Thereafter, the user 24-N initiates the game client 22-N on the computing device 14-N. The game client 22-N, as part of the initialization stage, communicates with the game controller 34 to identify the game client 22-N as participating in the game. The game controller 34 begins the time synchronization process with the game client 22-N discussed above with the client 22-1. Afterward, the game controller 34 is time synchronized with the computing devices 14-1, 14-N. The game controller 34 also determines a network delay value that quantifies an amount of time for a message to travel between the game controller 34 and the computing device 14-N.

Based on the network delay values associated with the computing device 14-1 and the computing device 14-N, the game controller 34 determines a timing window. The timing window defines a period of time during which only a single synchronized event is to be processed by the computing devices 14. In some implementations, the timing window may be based on a greatest network delay value associated with the computing devices 14-1, 14-N. In some embodiments, the timing window may be the greatest network delay value plus some predetermined buffer value as a safety margin.

Some or many of the events in the game may not be time-synchronized events. As an example, the game client 22-1 may provide a period of time, during which the user 24-1 can select a particular bow from a plurality of different potential bows to use, and allows the user 24-1 to get in a ready position to shoot a target that will appear on the display device 26-1 at some point in the future. Similarly, the game client 22-N provides a period of time, during which the user 24-N can select a particular bow from the plurality of different potential bows to use, and allows the user 24-N to get in a ready position to shoot the target that will appear on the display device 26-N at some point in the future. The game clients 22-1 and 22-N send the game controller 34 a message indicating that the users 24-1 and 24-N are ready for a target.

The game controller 34 generates a message that includes 1) event information that identifies an event, and 2) an event depiction timestamp that identifies a future time at which the game clients 22-1 and 22-N are to concurrently depict the event to the users 24-1, 24-N via the display devices 26-1, 26-N, respectively. The event information, in this example, indicates that a target is to be depicted at a certain location on the display devices 26-1, 26-N at the future point in time identified by the event depiction timestamp. The game controller 34 sends the message to the game clients 22-1, 22-N executing on the computing devices 14-1, 14-N, respectively.

It is noted that, because a game client 22 is a component of the corresponding computing device 14, functionality implemented by the game client 22 may be attributed to the corresponding computing device 14 generally. Moreover, in examples where the game client 22 comprises software instructions that program the processor device 16 to carry out functionality discussed herein, functionality implemented by the game client 22 may be attributed herein to the processor device 16 of the corresponding computing device 14.

Figure 1B:
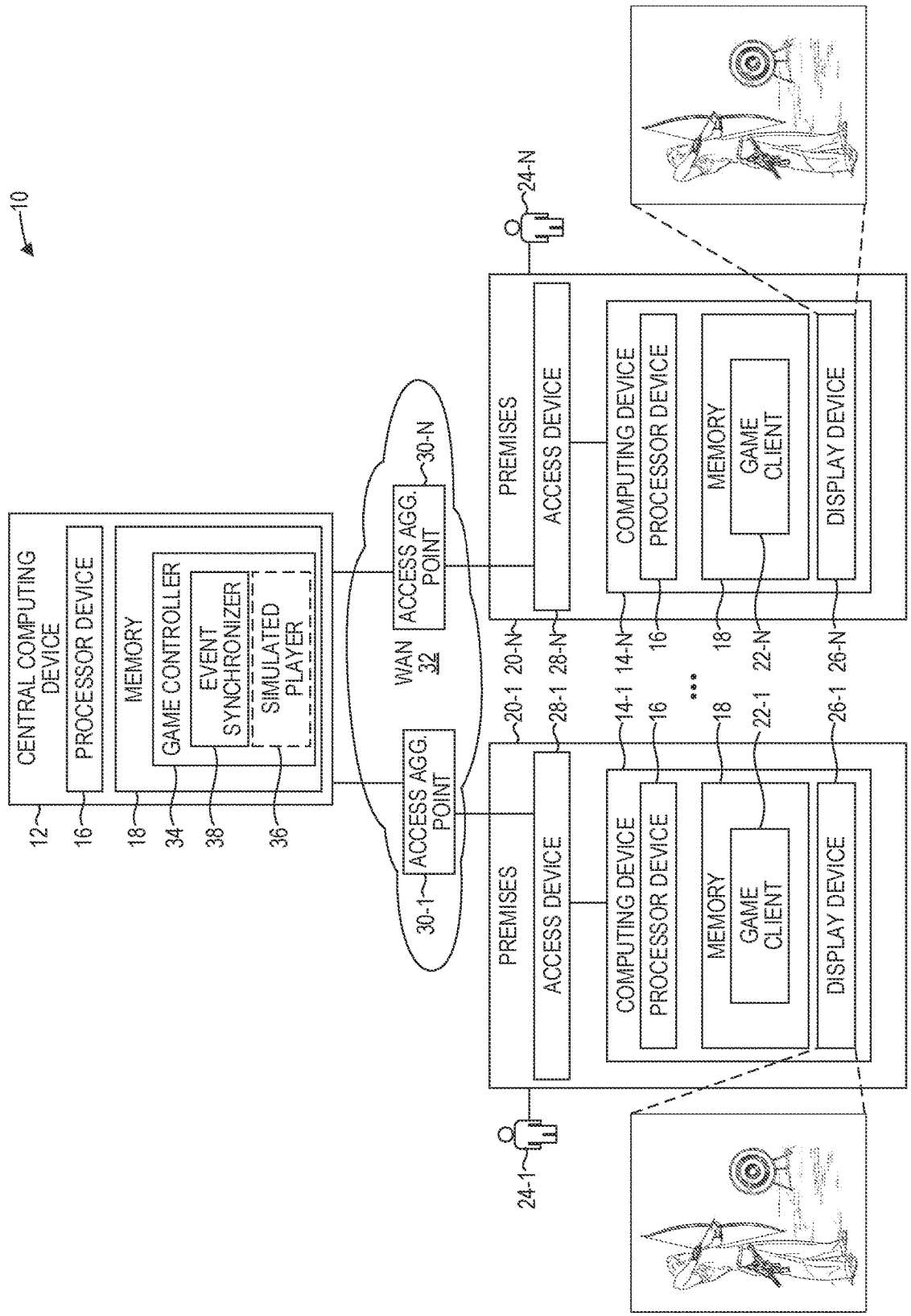

Referring now to FIG. 1B, the game clients 22-1, 22-N receive the message and, at the future point in time, concurrently present the target at the identified location on the display devices 26-1, 26-N. The users 24-1, 24-N each adjust the bow as they deem appropriate to successfully hit the depicted target with an arrow and release the arrow via some user input. The game clients 22-1, 22-N each receive the corresponding user inputs and generate a message that includes action information that identifies the user input and includes an action timestamp that identifies the time at which the user input was received by the corresponding game clients 22-1, 22-N. In this example, the action information also includes orientation information of the bows of each of the users 24-1, 24-N and velocity information regarding a speed at which each user 24-1, 24-N emitted the arrows. The game clients 22-1, 22-N send the messages to the game controller 34.

The game controller 34 receives the messages. Assume that, due to geographic proximity, the game controller 34 receives the message from the game client 22-N prior to receiving the message from the game client 22-1. The game controller 34 orders the messages based on the action timestamps in the messages. In this example, even though the message from the game client 22-1 was received later than the message from the game client 22-N, the action timestamp in the message from the game client 22-1 is several milliseconds earlier than that in the message from the game client 22-N. The game controller 34 thus determines that the user 24-1 reacted earlier than the user 24-N. The game controller 34 determines that the velocity information and orientation information from the messages also indicates that the user 24-1 struck the target prior to the user 24-N.

Figure 1C:
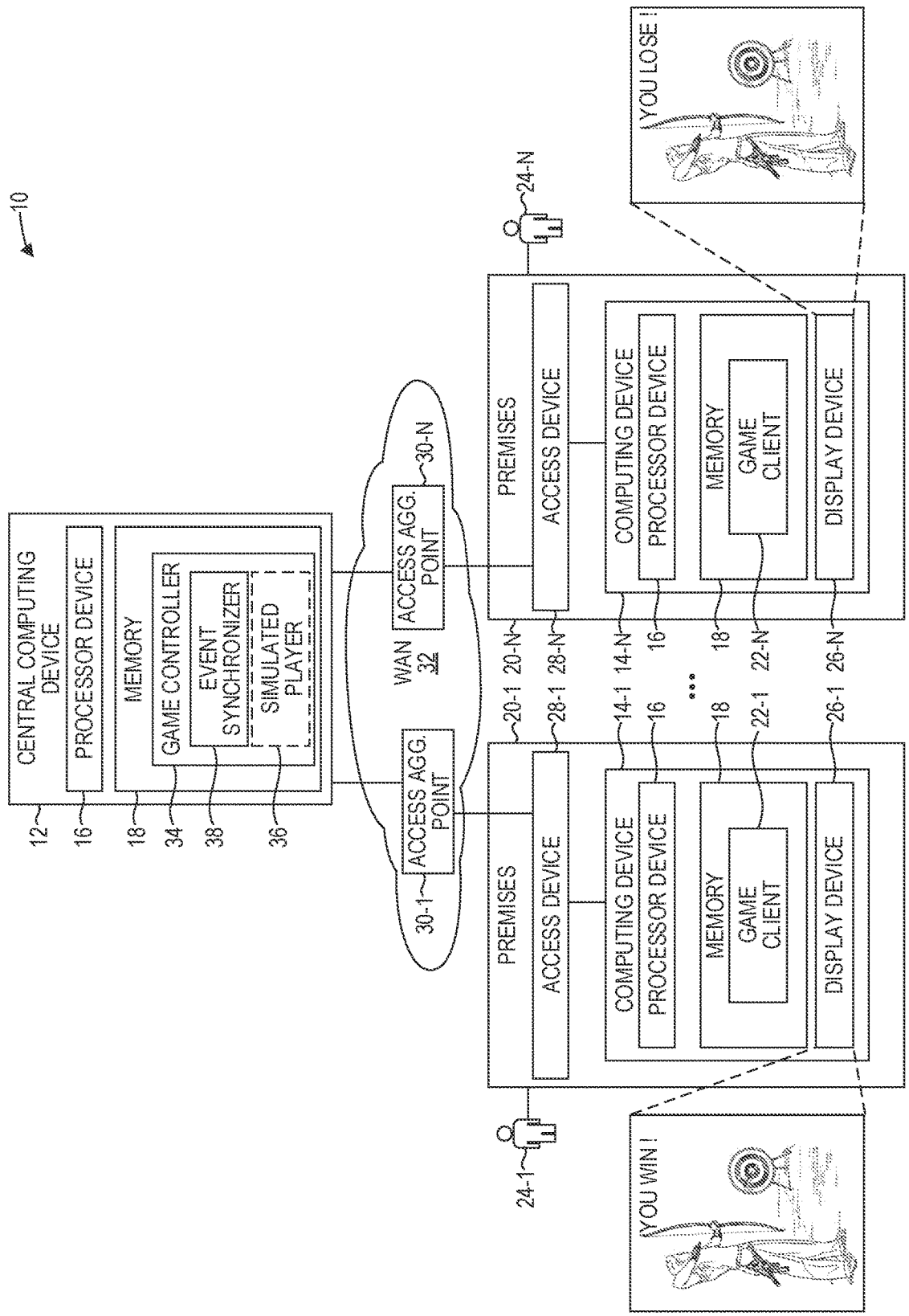

Referring now to FIG. 1C, the game controller 34 generates messages that contain event information that identifies an event for each of the game clients 22-1, 22-N. The event for the game client 22-1 is a message that indicates that the user 24-1 won the game, and the event for the game client 22-N is a message that the user 24-N lost the game, and sends the messages to the game clients 22-1, 22-N. This event is not time synchronized, and thus the game controller 34 does not include an action timestamp that identifies a future time at which the messages are to be concurrently displayed. Thus, the game clients 22-1, 22-N display the relevant events upon receipt, in a non-synchronized manner.

Figure 1D:
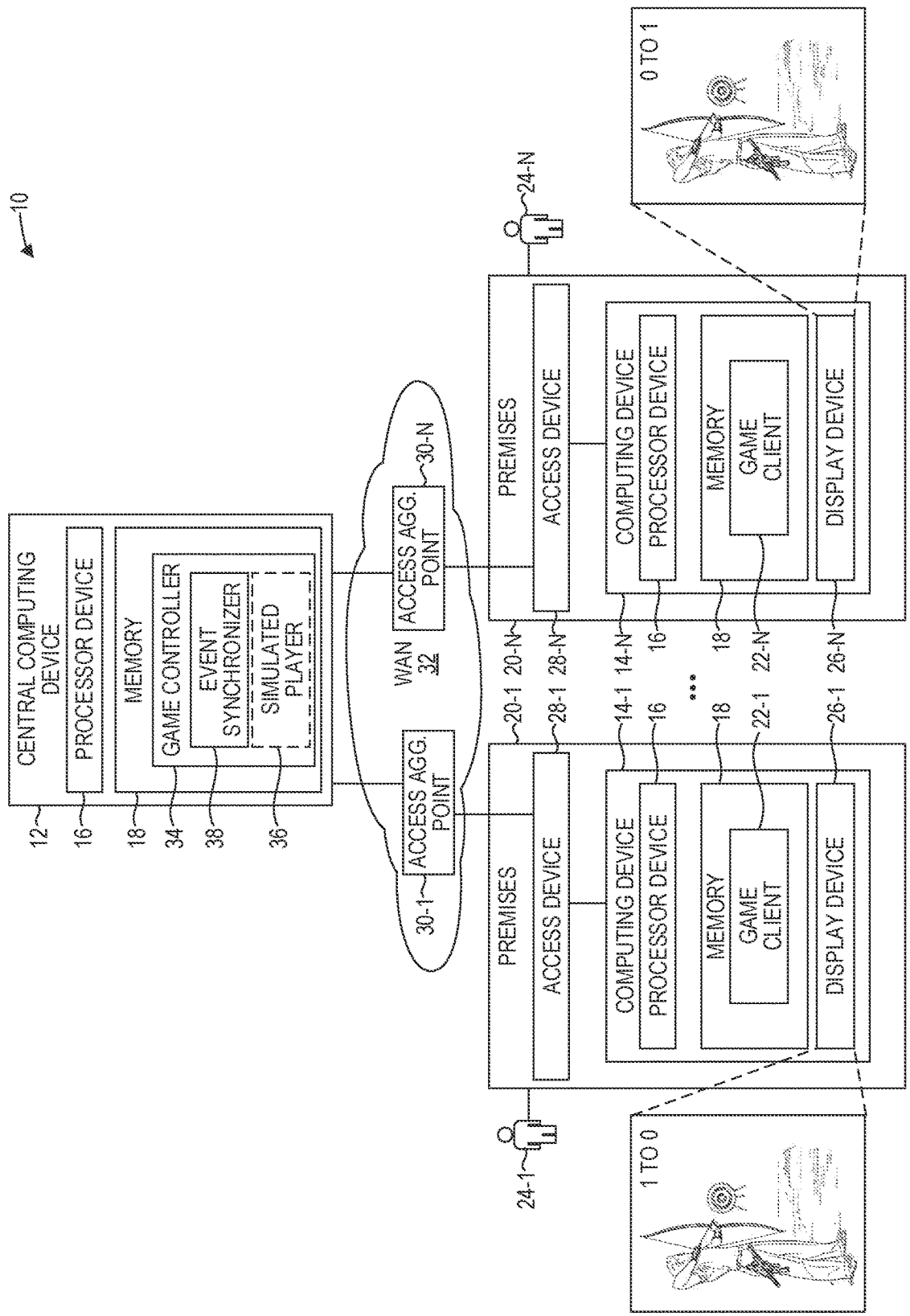

FIG. 1D illustrates an alternative implementation of the game to that illustrated in FIG. 1C. In this implementation of the game, the game may be won by the first player who first hits five targets. In this implementation, after determining that the user 24-1 struck the target prior to the user 24-N, the game controller 34 generates a second synchronized message that includes 1) event information that identifies an event, and 2) an event depiction timestamp that identifies a future time at which the game clients 22-1, 22-N are to concurrently depict the event to the users 24-1, 24-N via the display devices 26-1, 26-N, respectively. The event information, in this example, indicates that a target is to be depicted at a different location on the display devices 26-1, 26-N at the future point in time identified by the event depiction timestamp. The event information may also include information indicating that the user 24-1 has a score of 1 and the user 24-N as a score of zero. The game controller 34 sends the message to the game clients 22-1, 22-N executing on the computing devices 14-1, 14-N, respectively.

The game clients 22-1, 22-N receive the message and, at the future point in time, concurrently present the target at the identified location on the display devices 26-1, 26-N, along with information indicating the current score. The users 24-1, 24-N each adjust the bow as they deem appropriate to successfully hit the depicted target with an arrow and release the arrow via some user input. The game clients 22-1, 22-N each receive the corresponding user inputs and generate a message that includes action information that identifies the user input and includes an action timestamp that identifies the time at which the user input was received by the corresponding game clients 22-1, 22-N. This process may repeat until one of the users 24-1-24-N wins the game.

Figure 2:
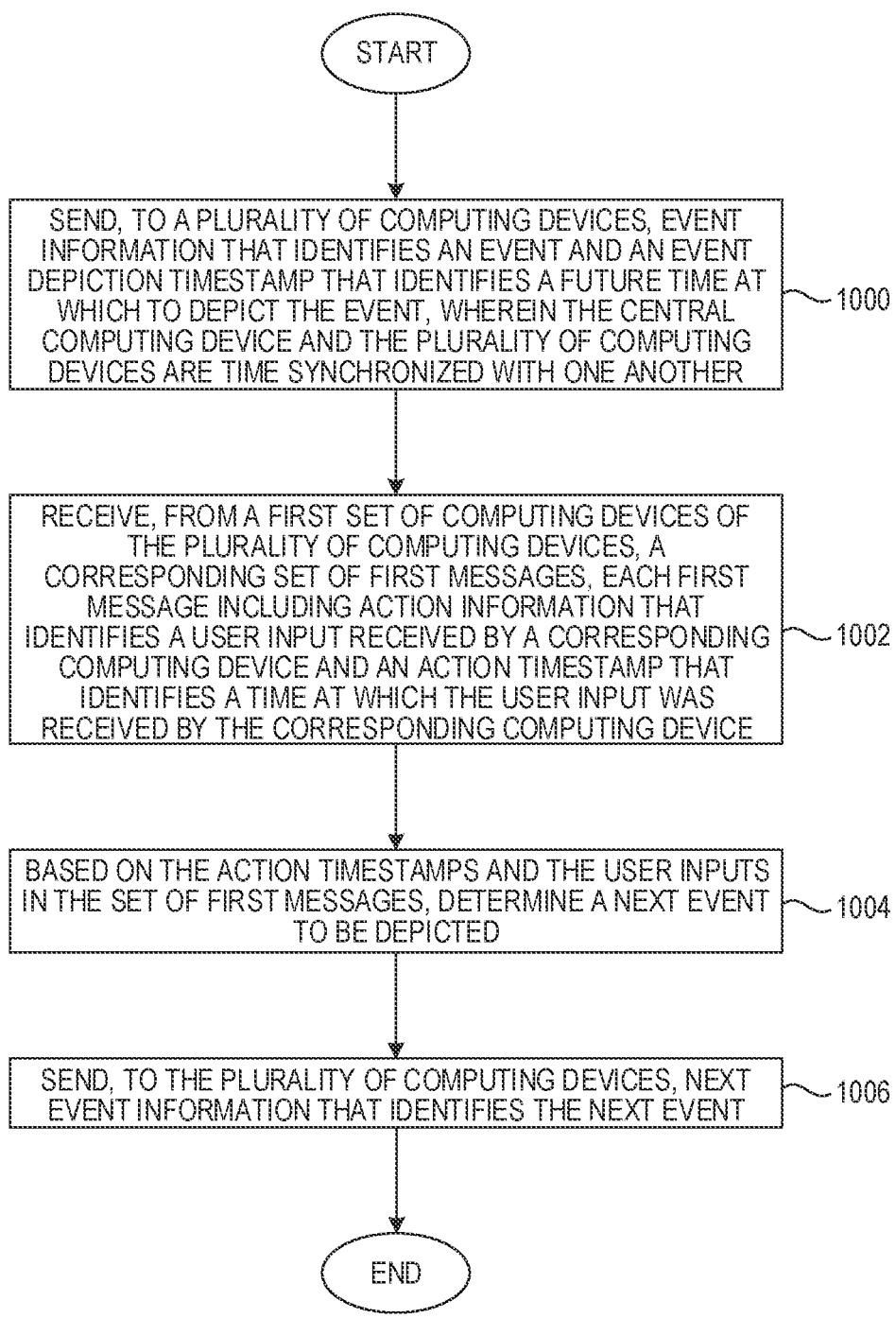
FIG. 2 is a flowchart of a method for event synchronization in an online game, according to one embodiment.

FIG. 2 is a flowchart of a method for event synchronization in an online game, according to one embodiment. The central computing device 12 sends, to the plurality of computing devices 14, event information that identifies an event and an event depiction timestamp that identifies a future time at which to depict the event, wherein the central computing device 12 and the plurality of computing devices 14 are time synchronized with one another (FIG. 2, block 1000). The central computing device 12 receives, from a first set of computing devices 14 of the plurality of computing devices 14, a corresponding set of first messages, each first message including action information that identifies a user input received by a corresponding computing device 14 and an action timestamp that identifies a time at which the user input was received by the corresponding computing device 14 (FIG. 2, block 1002). The central computing device 12, based on the action timestamps and the user inputs in the set of first messages, determines a next event to be depicted (FIG. 2, block 1004). The central computing device 12 sends, to the plurality of computing devices 14, next event information that identifies the next event (FIG. 2, block 1006).

Figure 3:
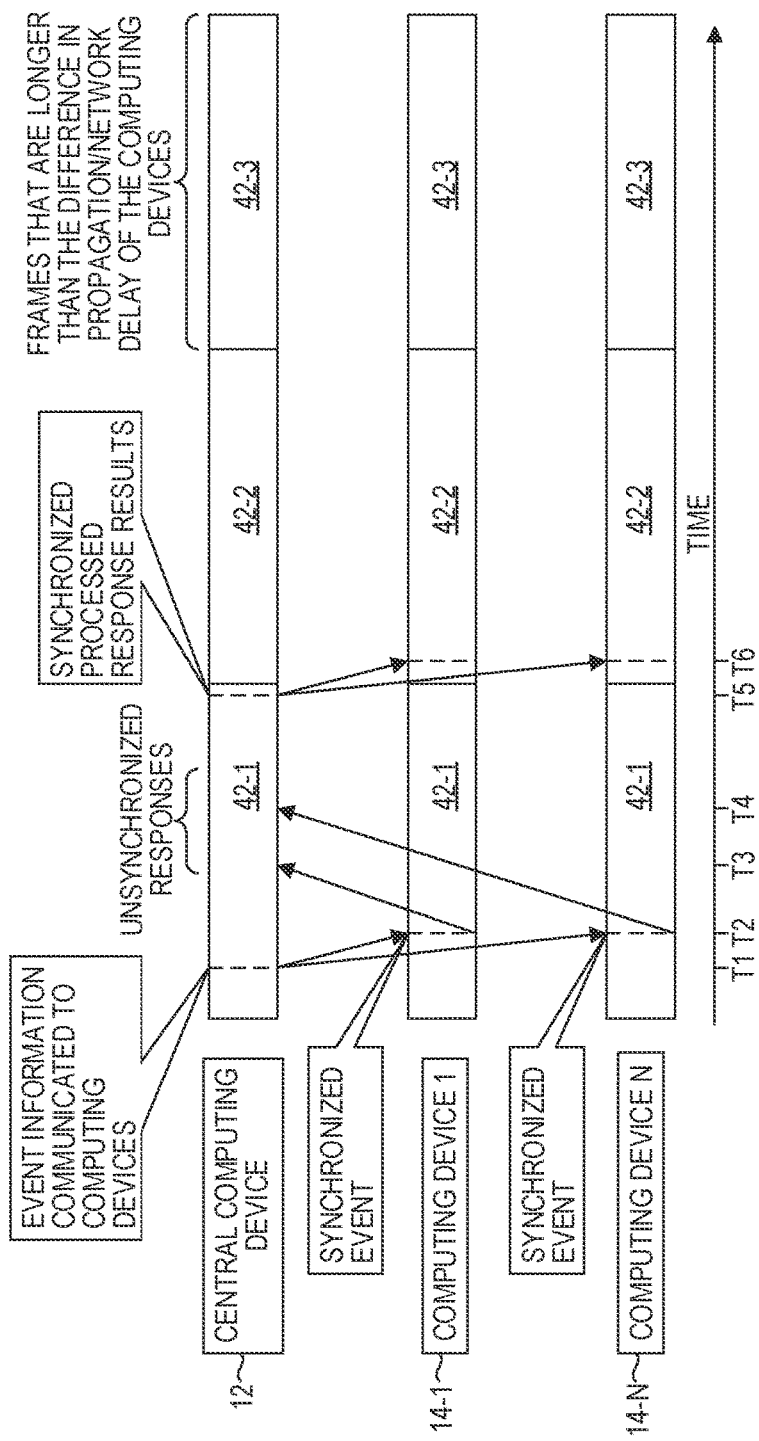
FIG. 3 is a diagram that illustrates actions taken in successive timing windows, according to one embodiment.

FIG. 3 is a diagram 40 that illustrates actions taken in successive timing windows 42-1, 42-2, and 42-3 (generally, timing windows 42) according to one embodiment. As discussed above, the timing windows 42-1, 42-2, and 42-3 are a same, fixed period of time that defines the period of time during which only a single synchronized event is to be processed by the computing devices 14. The timing windows 42 may be determined by the central computing device 12 and be based on a greatest network delay value associated with the computing devices 14-1, 14-N.

At a time T1 during the timing window 42-1, the central computing device 12 communicates event information regarding a synchronized event to the computing devices 14-1 and 14-N, which are time-synchronized with the central computing device 12. The event information contains an event depiction timestamp that identifies a time T2. At the time T2, the computing devices 14-1 and 14-N depict the event on the display devices 26-1, 26-N. The computing device 14-1 sends a message identifying a user input and a timestamp of the user input to the central computing device 12, which is received by the central computing device 12 at a time T3. The computing device 14-N sends a message identifying a user input and a timestamp of the user input to the central computing device 12, which is received by the central computing device 12 at a time T4. The central computing device 12 processes the messages, based in part on the timestamps contained in the messages, and generates next event information that identifies a next synchronized event, and an event depiction timestamp that identifies a time T6 of the timing window 42-2. At a time T5, the central computing device 12 communicates the next event information regarding the next synchronized event to the computing devices 14-1, 14-N. At the time T6, the computing devices 14-1 and 14-N depict the event on the display devices 26-1, 26-N.

Based on the network delay values associated with the computing device 14-1 and the computing device 14-N, the game controller 34 determines a timing window. The timing window defines a period of time during which only a single synchronized event is to be processed by the computing devices 14. In some implementations, the timing window may be based on a greatest network delay value associated with the computing devices 14-1, 14-N. In some embodiments, the timing window may be the greatest network delay value plus some predetermined buffer value as a safety margin.

Figure 4A:
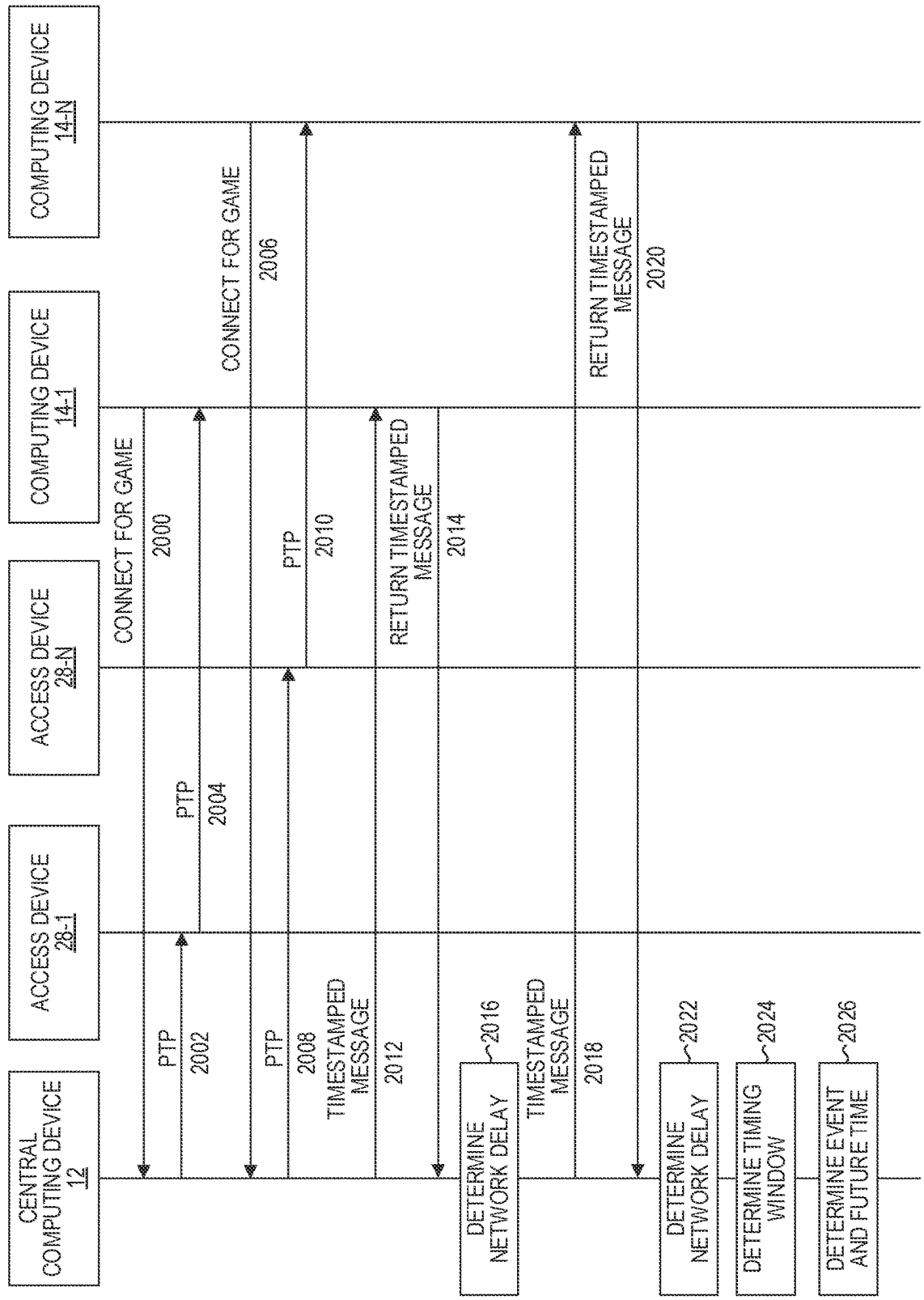
FIGS. 4A-4C are sequence diagrams that illustrate messages communicated between and actions taken by components illustrated in FIGS. 1A-1D to implement event synchronization in an online game according to another embodiment.
Figure 4B:
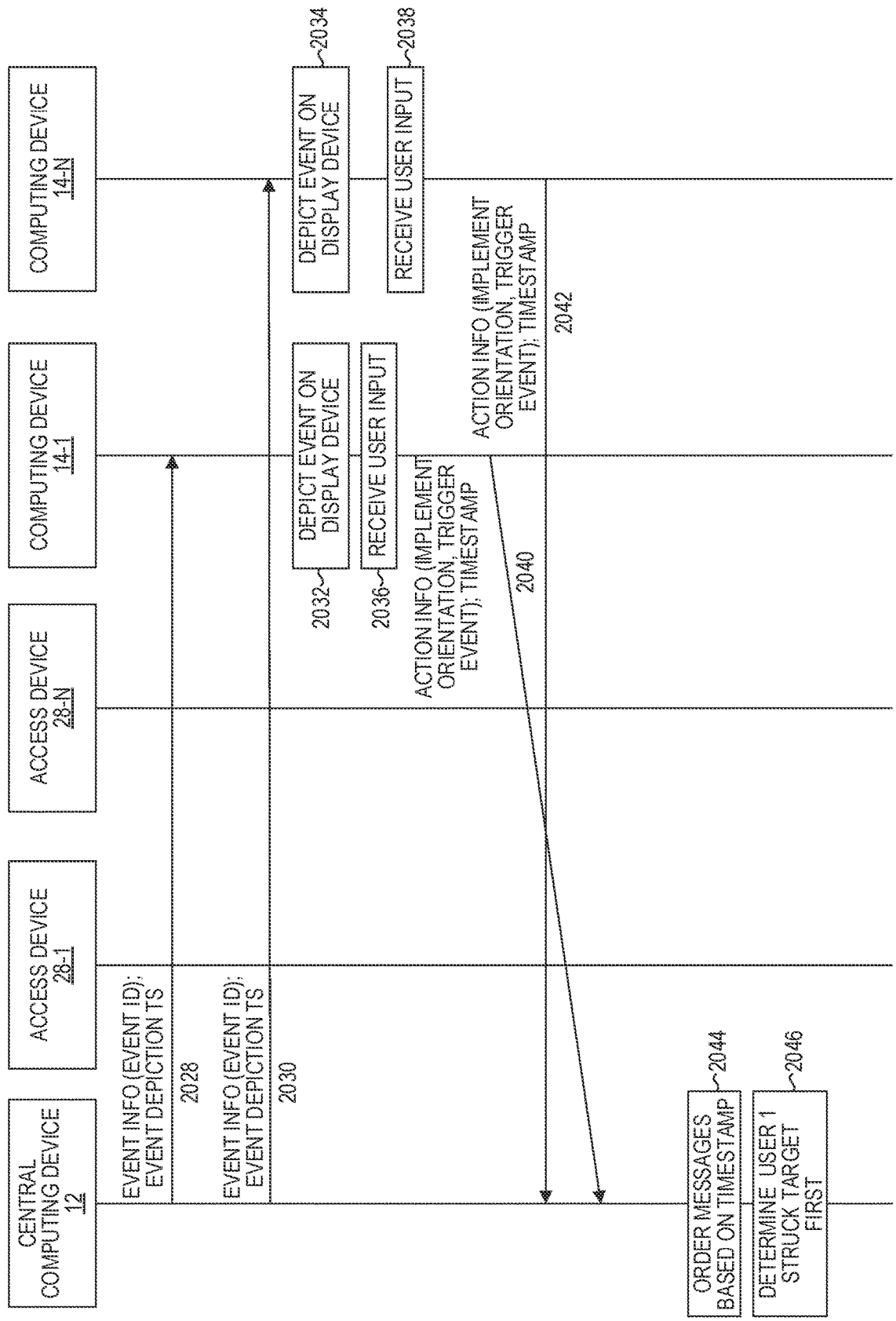
Figure 4C:
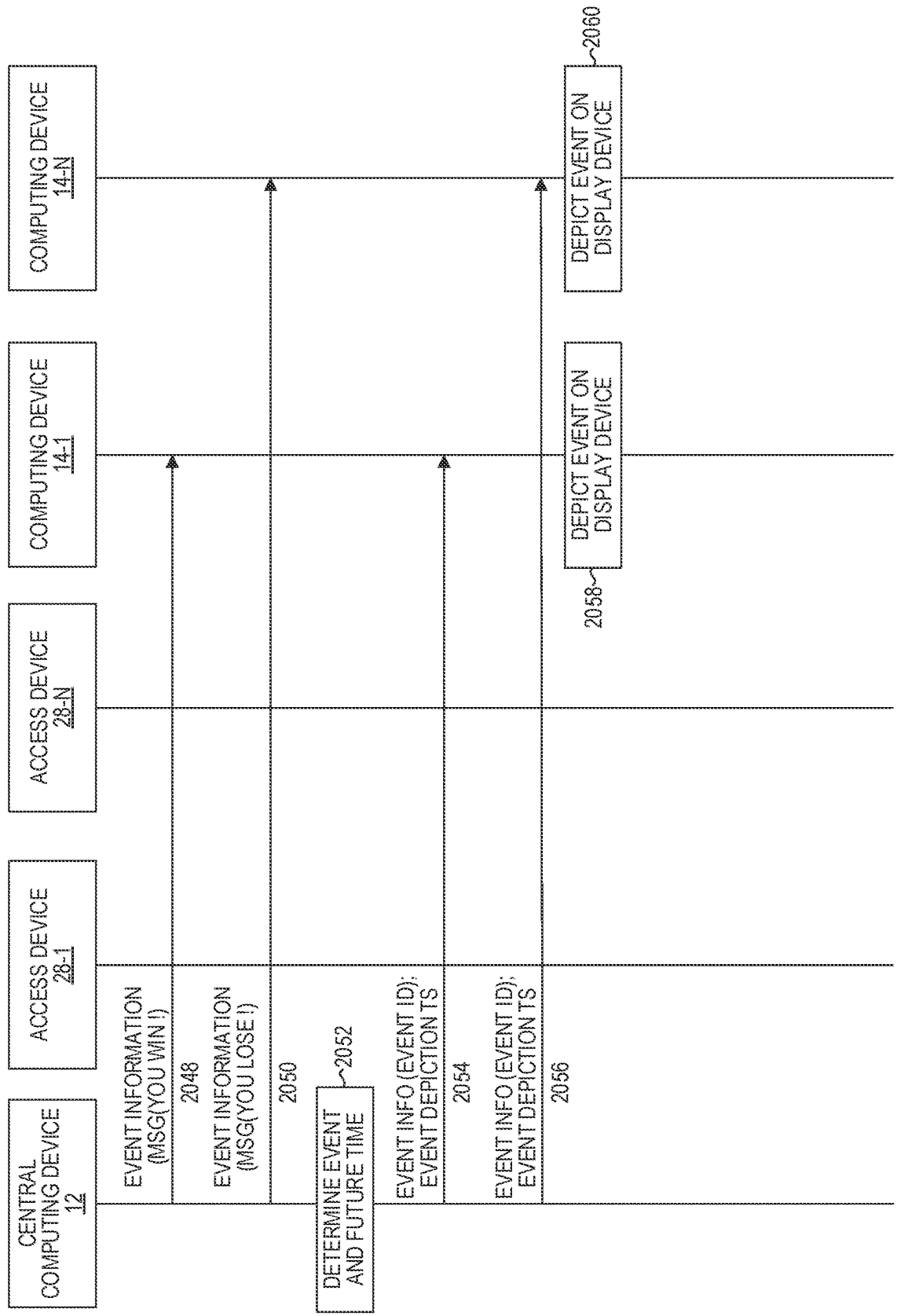

FIGS. 4A-4C are sequence diagrams that illustrate messages communicated between and actions taken by components illustrated in FIGS. 1A-1C to implement event synchronization in an online game according to another embodiment. The computing device 14-1 connects to the central computing device 12 during the initialization stage of the game (step 2000). The central computing device 12 initiates a PTP session with the access device 28-1 and sends one or more appropriate PTP messages to the access device 28-1 (step 2002). The access device 28-1 initiates a PTP session with the computing device 14-1 and sends one or more appropriate PTP messages to the computing device 14-1 (step 2004).

The computing device 14-N connects to the central computing device 12 during the initialization stage of the game (step 2006). The central computing device 12 initiates a PTP session with the access device 28-N and sends one or more appropriate PTP messages to the access device 28-N (step 2008). The access device 28-N initiates a PTP session with the computing device 14-N and sends one or more appropriate PTP messages to the computing device 14-N (step 2010). The central computing device 12 and the computing devices 14-1 and 14-N now have a synchronized clock.

To determine the network delay (sometimes referred to as propagation delay) between the central computing device 12 and the computing device 14-1, the central computing device 12 sends a timestamped message to the computing device 14-1 (step 2012). The computing device 14-1 timestamps the timestamped message and returns the timestamped message to the central computing device 12 (step 2014). The central computing device 12 then determines the network delay between the central computing device 12 and the computing device 14-1 (step 2016). The central computing device 12 sends a timestamped message to the computing device 14-N (step 2018). The computing device 14-N timestamps the timestamped message and returns the timestamped message to the central computing device 12 (step 2020). The central computing device 12 then determines the network delay between the central computing device 12 and the computing device 14-N (step 2022).

The central computing device 12 then determines a timing window that identifies a period of time during which only a single synchronized event may be sent to and received from the computing devices 14-1, 14-N (step 2024). In one embodiment, the central computing device 12 determines the timing window based on a greatest network delay value associated with the computing devices 14-1, 14-N, and adds an additional predetermined buffer value, such as 10 milliseconds (ms), 100 ms, or the like, as a safety margin.

The central computing device 12 determines a next event for the online game, and generates event information that identifies the event and an event depiction timestamp that identifies a future time at which the event is to be depicted by the computing devices 14-1, 14-N (step 2026). Referring now to FIG. 4B, the central computing device 12 sends the event information to the computing devices 14-1, 14-N (steps 2028, 2030). The computing devices 14-1, 14-N receive the event information, and, at the future time, concurrently display the event on the display devices 26-1, 26-N, respectively (steps 2032, 2034). The computing device 14-1 first receives user input from the user 24-1 (step 2036). The computing device 14-N then subsequently receives user input from the user 24-N (step 2038). The computing device 14-1 generates a message that includes action information that identifies the orientation of the shooting implement of the user 24-1, in this example a bow, and information indicating the user 24-1 released the arrow, and a timestamp that identifies the time that the arrow was released. The action information may include any other information relevant to the determination of whether or not the arrow struck the target and the timing of the strike, such as velocity, or the like. The computing device 14-1 sends the message to the central computing device 12 (step 2040).

The computing device 14-N generates a message that includes action information that identifies the orientation of the shooting implement of the user 24-N, and information indicating the user 24-N released the arrow, and a timestamp that identifies the time that the arrow was released. The computing device 14-N sends the message to the central computing device 12 (step 2042). Even though the message from the computing device 14-1 was sent prior to the message from the computing device 14-N, due to differences in network delay, the central computing device 12 receives the message from the computing device 14-N prior to receiving the message from the computing device 14-1.

The central computing device 12-1 orders the messages based on the timestamps contained in the messages (step 2044). Based on the ordered messages, and the information contained in the message, such as the orientation of the bows, velocity of the arrows, and the like, the central computing device 12-1 determines that the user 24-1 won that particular round (step 2046).

Referring now to FIG. 4C, the central computing device 12-1 generates event information for the computing device 14-1 that includes a message that indicates that the user 24-1 won that round, and sends the event information to the computing device 14-1 for presentation to the user 24-1 (step 2048). Note that the message does not include a depiction timestamp because the event is not a synchronized event. The central computing device 12-1 also generates event information for the computing device 14-N that includes a message that indicates that the user 24-N lost that round, and sends the event information to the computing device 14-N for presentation to the user 24-N (step 2050).

The central computing device 12-1 then starts the next round by determining a next event for the online game, and generates event information that identifies the next event and an event depiction timestamp that identifies a future time at which the next event is to be depicted by the computing devices 14-1, 14-N (step 2052). The central computing device 12 sends the event information to the computing devices 14-1, 14-N (steps 2054, 2056). The computing devices 14-1, 14-N receive the event information, and, at the future time, concurrently display the event on the display devices 26-1, 26-N, respectively (steps 2058, 2060). This process repeats until the online game finishes.

Figure 5:
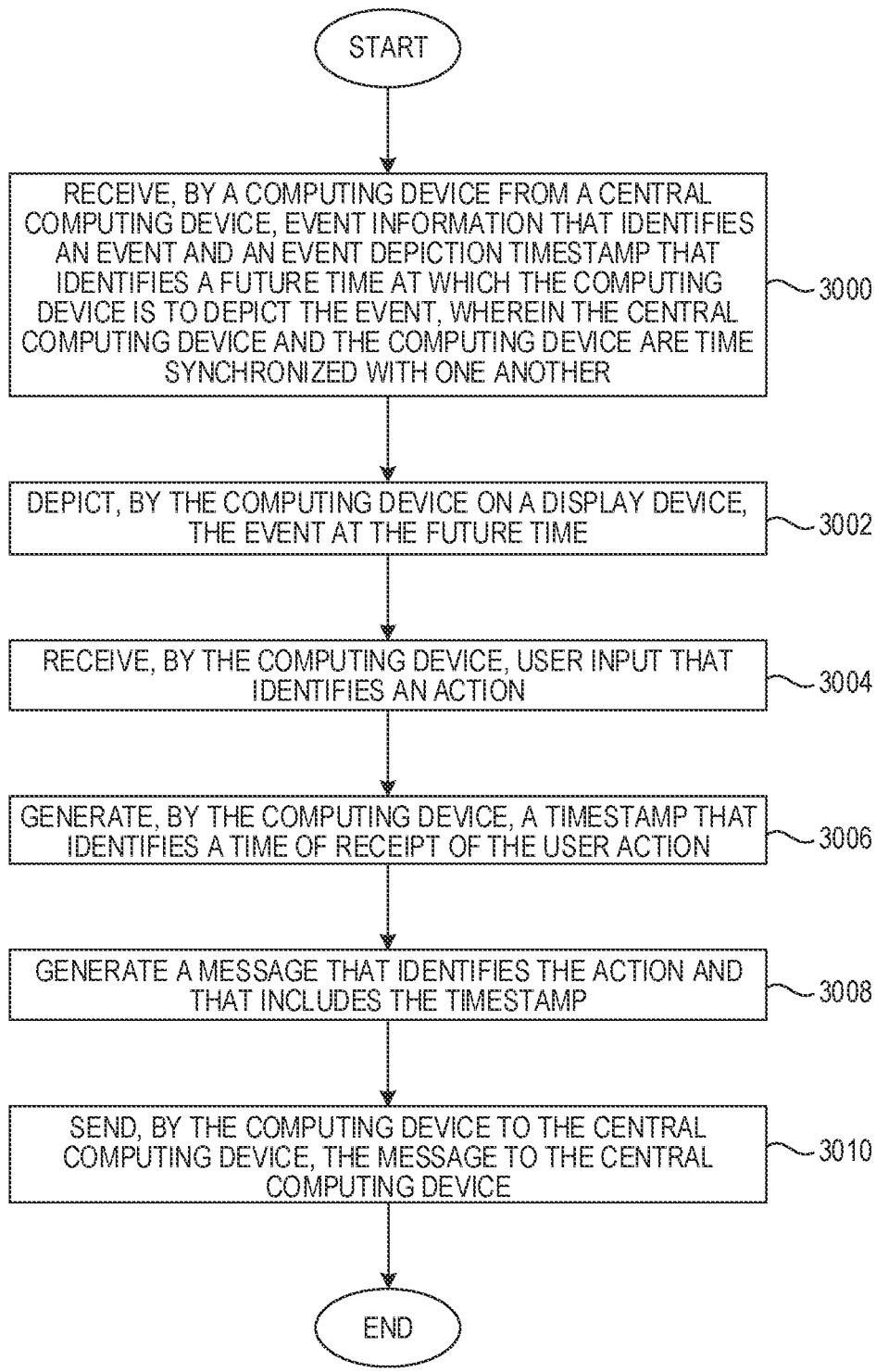
FIG. 5 is a flowchart of a method for event synchronization in an online game from the perspective of a computing device, according to another embodiment.

FIG. 5 is a flowchart of a method for event synchronization in an online game from the perspective of a computing device, according to another embodiment. FIG. 5 will be discussed in conjunction with FIGS. 1A-1C. The computing device 14-1 receives, from the central computing device 12, event information that identifies an event and an event depiction timestamp that identifies a future time at which the computing device 14-1 is to depict the event, wherein the central computing device 12 and the computing device 14-1 are time synchronized with one another (FIG. 5, block 3000). The computing device 14-1 depicts, on the display device 26-1, the event at the future time (FIG. 5, block 3002). The computing device 14-1 receives user input that identifies an action (FIG. 5, block 3004). The computing device 14-1 generates a timestamp that identifies a time of receipt of the user action (FIG. 5, block 3006). The computing device 14-1 generates a message that identifies the action and that includes the timestamp (FIG. 5, block 3008). The computing device 14-1 sends the message to the central computing device 12 (FIG. 5, block 3010).

Figure 6:
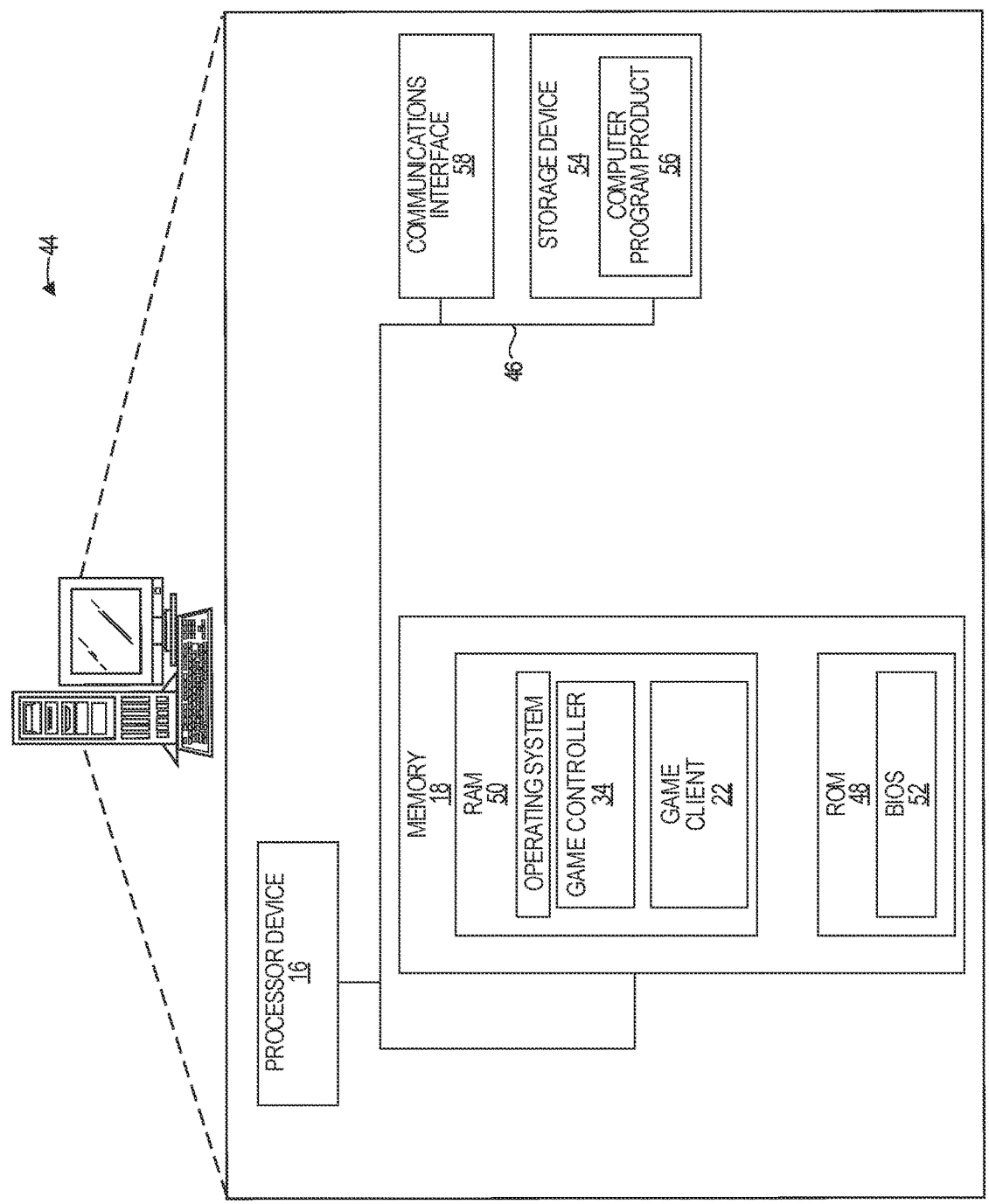
FIG. 6 is a block diagram of a computing device suitable for implementing computing devices illustrated in FIGS. 1A-1D.

FIG. 6 is a block diagram of a computing device 44 suitable for implementing the central computing device 12, or a computing device 14, according to various implementations. The computing device 44, when implementing the central computing device 12, may comprise any computing or electronic device capable of including firmware, hardware, and/or executing software instructions to implement the functionality described herein with regard to the central computing device 12, such as a computer server, a desktop computing device, a laptop computing device, or the like. The computing device 44, when implementing a computing device 14, may comprise any computing or electronic device capable of including firmware, hardware, and/or executing software instructions to implement the functionality described herein with regard to the computing device 14, such as a desktop or laptop computer, a game console, a smartphone, a computing tablet, or the like.

The computing device 44 includes the processor device 16, the memory 18, and a system bus 46. The system bus 46 provides an interface for system components including, but not limited to, the system memory 18 and the processor device 16. The processor device 16 can be any commercially available or proprietary processor.

The system bus 46 may be any of several types of bus structures that may further interconnect to a memory bus (with or without a memory controller), a peripheral bus, and/or a local bus using any of a variety of commercially available bus architectures. The system memory 18 may include non-volatile memory 48 (e.g., read-only memory (ROM), erasable programmable read-only memory (EPROM), electrically erasable programmable read-only memory (EEPROM), etc.), and volatile memory 50 (e.g., random-access memory (RAM)). A basic input/output system (BIOS) 52 may be stored in the non-volatile memory 48 and can include the basic routines that help to transfer information between elements within the computing device 44. The volatile memory 50 may also include a high-speed RAM, such as static RAM, for caching data.

The computing device 44 may further include or be coupled to a non-transitory computer-readable storage medium such as a storage device 54, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 54 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 54 and in the volatile memory 50, including an operating system and one or more program modules, such as the game controller 34 and/or the game client 22, which may implement the functionality described herein in whole or in part. All or a portion of the examples may be implemented as a computer program product 56 stored on a transitory or non-transitory computer-usable or computer-readable storage medium, such as the storage device 54, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16.

The computing device 44 may also include a communications interface 58 suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   determining, by a central computing device for each of a plurality of computing devices, a corresponding network delay value that quantifies an amount of time for a message to travel between the central computing device and the corresponding computing device;
   determining, by the central computing device and based on all of the network delay values for all of the plurality of computing devices, a single timing window that identifies a same, fixed period of time for all of the plurality of computing devices during which only a single synchronized event is to be provided to all of the plurality of computing devices, wherein the single synchronized event comprises a round of an online game that includes multiple rounds;
   sending, by the central computing device to the plurality of computing devices, event information that identifies the single synchronized event and an event depiction timestamp that identifies a future time at which to depict the single synchronized event, wherein the central computing device and the plurality of computing devices are time synchronized with one another;

receiving, by the central computing device, from a first set of computing devices of the plurality of computing devices, a corresponding set of first messages, each first message including action information that identifies a user input received by a corresponding computing device and an action timestamp that identifies a time at which the user input was received by the corresponding computing device;

based on the action timestamps and the user inputs in the set of first messages, determining a next event to be depicted; and sending, to the plurality of computing devices, next event information that identifies the next event, wherein the next event comprises a next round of the online game.

2. The method of claim 1 wherein the next event information further comprises a next event depiction timestamp that identifies a future time at which the plurality of computing devices is to depict the next event.

3. The method of claim 1 further comprising:

subsequent to the future time, receiving, by the central computing device from a second set of computing devices of the plurality of computing devices, a corresponding set of second messages, each second message including action information that identifies a user input received by a corresponding computing device in the second set of computing devices and an action timestamp that identifies a time at which the user input was received by the corresponding computing device;

based on the action timestamps and the user inputs in the set of second messages, determining a subsequent event to be depicted; and sending, to the plurality of computing devices, subsequent event information that identifies the subsequent event and a subsequent event depiction timestamp that identifies a future time at which the plurality of computing devices is to depict the subsequent event.

4. The method of claim 1 wherein the central computing device comprises a game server that is configured to determine a chronological progression of events in a game.

5. The method of claim 1 further comprising:

communicating, by the central computing device to each of the plurality of computing devices, synchronization information configured to time synchronize the central computing device and the plurality of computing devices.

6. The method of claim 1 wherein the plurality of computing devices utilize a global positioning system (GPS) for time synchronization.

7. The method of claim 1 wherein the plurality of computing devices utilize a Precision Timing Protocol (PTP) for time synchronization.

8. The method of claim 7 further comprising:

establishing, by the central computing device, with each of a plurality of access devices, a precision timing protocol session, each access device corresponding to one of the plurality of computing devices and being configured to couple the corresponding computing device to a wide area network.

9. The method of claim 1 wherein determining the single timing window further comprises:

determining a greatest network delay value of the network delay values; and determining the single timing window based on the greatest network delay value.

10. The method of claim 1 wherein the action information received from each computing device in the first set of computing devices includes an orientation of a virtual implement configured to emit an object upon a trigger event caused by a corresponding user, and event information that indicates the corresponding user caused the trigger event.

11. The method of claim 1 wherein the next event comprises a target to be depicted.

12. A central computing device, comprising:

a memory; and a processor device coupled to the memory and configured to:

determine, for each of a plurality of computing devices, a corresponding network delay value that quantifies an amount of time for a message to travel between the central computing device and the corresponding computing device;

determine, based on all of the network delay values for all of the plurality of computing devices, a single timing window that identifies a same, fixed period of time for all of the plurality of computing devices during which only a single synchronized event is to be provided to all of the plurality of computing devices, wherein the single synchronized event comprises a round of an online game that includes multiple rounds;

send, to a plurality of computing devices, event information that identifies the single synchronized event and an event depiction timestamp that identifies a future time at which to depict the single synchronized event, wherein the central computing device and the plurality of computing devices are time synchronized with one another;

receive, from a first set of computing devices of the plurality of computing devices, a corresponding set of first messages, each first message including action information that identifies a user input received by a corresponding computing device and an action timestamp that identifies a time at which the user input was received by the corresponding computing device;

based on the action timestamps and the user inputs in the set of first messages, determine a next event to be depicted; and send, to the plurality of computing devices, next event information that identifies the next event, wherein the next event comprises a next round of the online game.

13. The central computing device of claim 12, wherein the processor device is further configured to:

subsequent to the future time, receive, from a second set of computing devices of the plurality of computing devices, a corresponding set of second messages, each second message including action information that identifies a user input received by a corresponding computing device in the second set of computing devices and an action timestamp that identifies a time at which the user input was received by the corresponding computing device;

based on the action timestamps and the user inputs in the set of second messages, determine a subsequent event to be depicted; and send, to the plurality of computing devices, subsequent event information that identifies the subsequent event and a subsequent event depiction timestamp that identifies a future time at which the plurality of computing devices is to depict the subsequent event.

14. The central computing device of claim 12 wherein the central computing device comprises a game server that is configured to determine a chronological progression of events in a game.

15. The central computing device of claim 12, wherein the processor device is further configured to:
communicate, to each of the plurality of computing devices, synchronization information configured to time synchronize the central computing device and the plurality of computing devices.

16. A non-transitory computer-readable storage medium that includes executable instructions to cause a processor device to:
determine, for each of a plurality of computing devices, a corresponding network delay value that quantifies an amount of time for a message to travel between a central computing device and the corresponding computing device;
determine, based on all of the network delay values for all of the plurality of computing devices, a single timing window that identifies a same, fixed period of time for all of the plurality of computing devices during which only a single synchronized event is to be provided to all of the plurality of computing devices, wherein the single synchronized event comprises a round of an online game that includes multiple rounds;
send, to the plurality of computing devices, event information that identifies the single synchronized event and an event depiction timestamp that identifies a future time at which to depict the single synchronized event, wherein the central computing device and the plurality of computing devices are time synchronized with one another;
receive, from a first set of computing devices of the plurality of computing devices, a corresponding set of first messages, each first message including action information that identifies a user input received by a corresponding computing device and an action timestamp that identifies a time at which the user input was received by the corresponding computing device;
based on the action timestamps and the user inputs in the set of first messages, determine a next event to be depicted; and
send, to the plurality of computing devices, next event information that identifies the next event, wherein the next event comprises a next round of the online game.

17. The non-transitory computer-readable storage medium of claim 16, wherein the instructions further cause the processor device to:
communicate, to each of the plurality of computing devices, synchronization information configured to time synchronize the central computing device and the plurality of computing devices.

* * * * *